(12) United States Patent
Nakano et al.

(10) Patent No.: US 9,452,787 B2
(45) Date of Patent: Sep. 27, 2016

(54) VEHICLE FRONT PORTION STRUCTURE

(71) Applicant: TOYOTA JIDOSHA KABUSHIKI KAISHA, Toyota-shi (JP)

(72) Inventors: Nobuhiro Nakano, Nagakute (JP); Yukiko Nawa, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/711,998

(22) Filed: May 14, 2015

(65) Prior Publication Data

US 2015/0344071 A1 Dec. 3, 2015

(30) Foreign Application Priority Data

Jun. 3, 2014 (JP) ................... 2014-115155

(51) Int. Cl.
*B62D 25/04* (2006.01)
*B62D 21/15* (2006.01)

(52) U.S. Cl.
CPC ............. *B62D 25/04* (2013.01); *B62D 21/152* (2013.01)

(58) Field of Classification Search
CPC .... B60R 19/00; B62D 21/15; B62D 21/152; B62D 25/04; B62D 25/08; B62D 31/00
USPC ........ 296/30, 187.09, 187.1, 187.12, 193.06, 296/193.09, 198
See application file for complete search history.

(56) References Cited

U.S. PATENT DOCUMENTS

| 8,857,896 | B2* | 10/2014 | Pyun ..................... B62D 25/04 296/187.09 |
| 2015/0246692 | A1* | 9/2015 | Rangaswamaiah .... B62D 25/04 296/187.1 |

FOREIGN PATENT DOCUMENTS

| JP | 2010-143333 | 7/2010 |
| JP | 2013-1226 | 1/2013 |

* cited by examiner

*Primary Examiner* — Jason S Daniels
(74) *Attorney, Agent, or Firm* — Oblon, McClelland, Maier & Neustadt, L.L.P

(57) ABSTRACT

There is provided a vehicle front portion structure including: a front pillar having a lower portion disposed on a vehicle rear side of a front wheel well; a rocker having a front end portion joined to a lower end portion of the lower portion of the front pillar; and a reinforcing member that is formed with a length in a vehicle up and down direction, is disposed near a vehicle front side in the lower portion of the front pillar, reinforces a front portion side of the lower portion, and is not joined to the rocker.

3 Claims, 12 Drawing Sheets

VEHICLE FRONT PORTION STRUCTURE

CROSS-REFERENCE TO RELATED APPLICATION

This application is based on and claims priority under 35 USC 119 from Japanese Patent Application No. 2014-115155 filed on Jun. 3, 2014, the disclosure of which is incorporated by reference herein.

BACKGROUND

1. Technical Field

The present invention relates to a vehicle front portion structure and particularly relates to a structure where a reinforcing member is disposed on the lower portion of a front pillar.

2. Related Art

In the side portion vehicle body structure for a vehicle described in Japanese Patent Application Laid-open (JP-A) No. 2013-001226, a side sill that extends in the vehicle front and rear direction is equipped with a side sill reinforcement, and a gusset member is disposed on the front end portion of the side sill reinforcement. Furthermore, a front pillar reinforcement is disposed on the lower portion of a lower side front pillar that extends upward from the front end portion of the side sill, and a first reinforcing member (inside reinforcing member) is disposed in the corner portion between the lower side front pillar and the side sill. Moreover, the lower side region of the front end portion of the bottom wall portion of the side sill reinforcement and the front side region of the lower end portion of the of the front wall portion of the front pillar reinforcement are coupled to one another by a second reinforcing member (outside reinforcing member).

In this structure, when the load of a frontal crash has been input to the lower side front pillar, the first reinforcing member acts in such a way as to counter the compressive force and the second reinforcing member acts in such a way as to counter the tensile force. This keeps the lower side front pillar from collapsing backward and controls deformation of the vehicle body at the door opening.

However, in a structure such as the one described above, when the load of a frontal crash has been input to the lower side front pillar, the lower side front pillar becomes locally deformed in the vicinity of the upper end of the front pillar reinforcement, and thus there is the potential for a moment trying to collapse the lower side front pillar backward to occur. As a result, when the side sill reinforcement (rocker reinforcement) becomes bent in the vicinity of the rear end of the gusset member, the deformation of the vehicle body at the door opening ends up increasing, so there is room for improvement in terms of controlling deformation of the cabin.

SUMMARY

In consideration of the circumstances described above, it is an object of the present invention to obtain a vehicle front portion structure that contributes to controlling deformation of the cabin at the time of a frontal crash.

A first aspect of the present invention provides a vehicle front portion structure including:

a front pillar having a lower portion disposed on a vehicle rear side of a front wheel well;

a rocker having a front end portion joined to a lower end portion of the lower portion of the front pillar; and a reinforcing member that is formed with a length in a vehicle up and down direction, is disposed near a vehicle front side in the lower portion of the front pillar, reinforces a front portion side of the lower portion, and is not joined to the rocker.

In the first aspect of the present invention, the reinforcing member formed long in the vehicle up and down direction is disposed in the lower portion of the front pillar disposed on the vehicle rear side of the front wheel well. The reinforcing member is disposed near the vehicle front side in the lower portion of the front pillar and reinforces the front portion side of the lower portion. For this reason, when the load of a frontal crash has been input to the lower portion of the front pillar, the rear portion side of the lower portion not reinforced by the reinforcing member becomes deformed, and thus the crash energy can be absorbed. Moreover, the reinforcing member is not joined to the rocker. For this reason, the crash load concentrates in the non-reinforced portion of the lower portion of the front pillar between the reinforcing member and the rocker, and the lower portion becomes deformed originating at the non-reinforced portion, and thus a bending moment can be kept from occurring in the rocker. This can contribute to preventing bending of the rocker. Thus, for the reasons stated above, according to the present invention, the present invention contributes to controlling deformation of the cabin.

It will be noted that "disposed near the vehicle front side" in the first aspect of the present invention means that the reinforcing member is one-sidedly disposed on the vehicle front side in the lower portion of the front pillar, and a configuration where the reinforcing member mates with the inside of the lower portion is not included in the technical scope of the first aspect of the present invention. However, a configuration where a part of the reinforcing member is disposed on the rear portion side of the lower portion is included in the technical scope of the first aspect of the present invention provided that the crash energy is absorbed by the deformation of the rear portion side of the lower portion described above.

A second aspect of the present invention provides the vehicle front portion structure of the first aspect, wherein a rear end portion of an upper member is joined to an upper end portion of the lower portion of the front pillar, and an upper end portion of the reinforcing member opposes, from the vehicle rear side, the rear end portion of the upper member.

In the second aspect of the present invention, the load from the upper member moving backward in the vehicle rear direction because of a frontal crash can be transmitted via the reinforcing member to the lower end portion side of the front pillar. This can effectively concentrate the crash load in the non-reinforced portion of the front pillar between the reinforcing member and the rocker. As a result, the deformation of the front pillar originating at the non-reinforced portion can be promoted.

A third aspect of the present invention provides the vehicle front portion structure of the first aspect, wherein the reinforcing member is disposed near a vehicle width direction outer side, in the lower portion of the front pillar.

In the third aspect of the present invention, the front pillar is reinforced by the reinforcing member disposed near the vehicle front side and near the vehicle width direction outside in the front pillar. Because the reinforcing member is locally disposed in the front pillar in this way, the amount of energy absorbed by the deformation of the front pillar can be effectively ensured, and, at the same time, mass and cost can be kept from increasing.

A fourth aspect of the present invention provides the vehicle front portion structure of the third aspect, wherein:

ridgelines that extend in the vehicle up and down direction are formed on both front and rear sides of a vehicle width direction outer side end portion of the lower portion of the front pillar, and the reinforcing member opposes the ridgelines on the front side.

In the fourth aspect of the present invention, the ridgelines on the front side of the vehicle width direction outside end portion of the front pillar are reinforced by the reinforcing member. Because of this, the front portion side of the front pillar can be effectively reinforced by the compact reinforcing member.

As described above, the vehicle front portion structure pertaining to the present invention contributes to controlling deformation of the cabin at the time of a frontal crash.

BRIEF DESCRIPTION OF THE DRAWINGS

An exemplary embodiment of the present invention will be described in detail based on the following figures, wherein.

DETAILED DESCRIPTION

Figure 1:
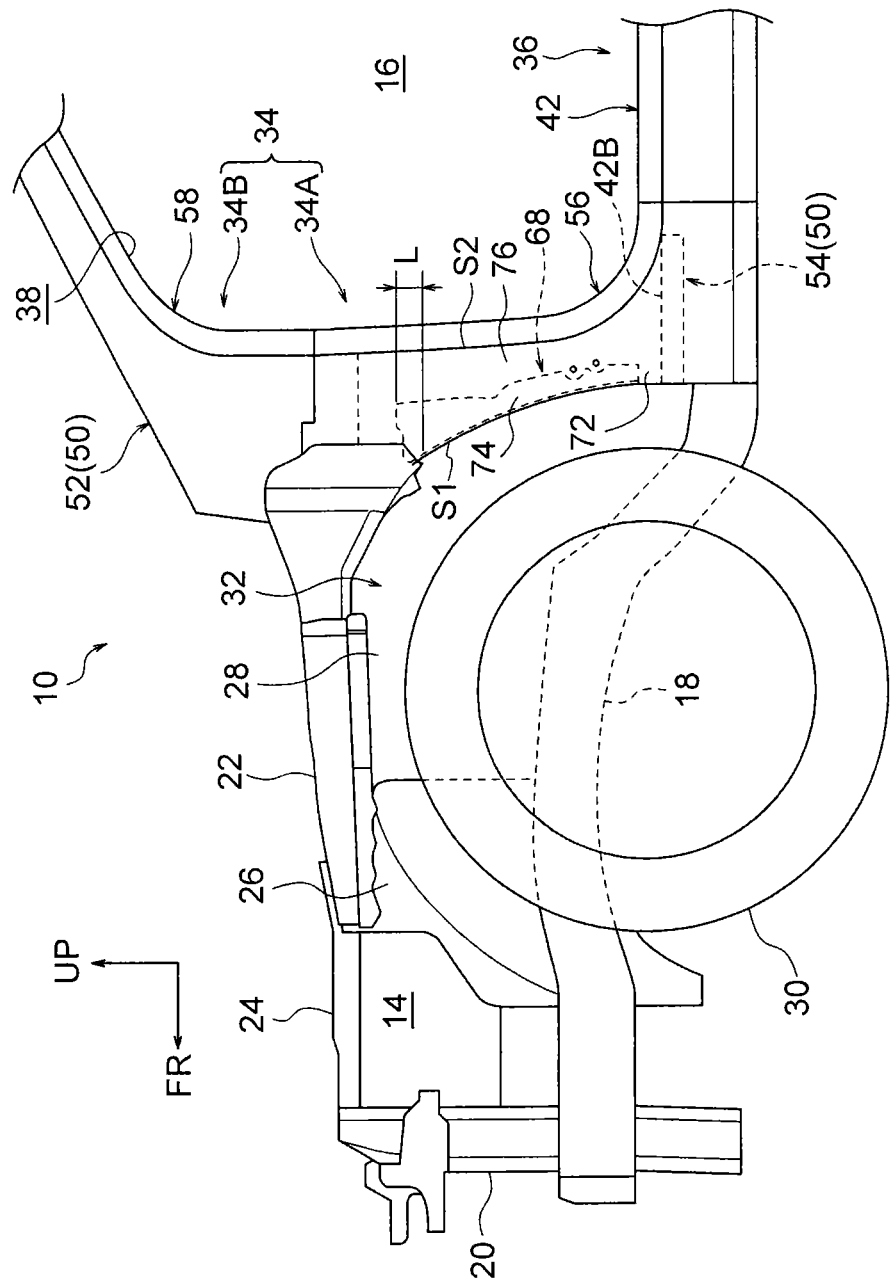
FIG. 1 is a side view showing the partial configuration of the front portion of an automobile to which a vehicle front portion structure pertaining to the embodiment of the present invention has been applied.

A vehicle front portion structure 10 pertaining to an embodiment of the present invention will be described on the basis of FIG. 1 to FIG. 10. It will be noted that arrow FR, arrow UP, and arrow OUT appropriately shown in the drawings indicate a frontward direction (traveling direction) of the vehicle, an upward direction, and an outward direction in the vehicle width direction, respectively. Below, in cases where description is given simply using the directions of front and rear, right and left, and up and down, unless otherwise noted these will be understood to mean front and rear in the vehicle front and rear direction, right and left in the vehicle right and left direction (vehicle width direction), and up and down in the vehicle up and down direction.

(Configuration)

In FIG. 1, the partial configuration of the front portion of an automobile 12 to which the vehicle front portion structure 10 pertaining to the present embodiment has been applied is shown in a side view. The automobile 12 is, for example, an ordinary sedan type automobile, and a power unit compartment 14 that houses a non-illustrated power unit is formed on the vehicle front side of a cabin 16. A pair of right and left front side members 18 extend along the vehicle front and rear direction on both vehicle width direction side portions of the lower portion of the power unit compartment 14. It will be noted that, because the automobile 12 pertaining to the present embodiment is configured to be bilaterally symmetrical, FIG. 1 to FIG. 10 show only the configuration of the left side of the automobile 12 and do not show the configuration of the right side.

The front end portions of the right and left front side members 18 are coupled to one another in the vehicle width direction by a radiator support 20 formed in a rectangular frame-like shape as seen from the vehicle front and rear direction. Furthermore, a pair of right and left apron upper members (upper members) 22 extend along the vehicle front and rear direction on the vehicle upper side and the vehicle width direction outsides of the right and left front side members 18. A coupling member 24 bridges the front end portions of the right and left apron upper members 22 and both vehicle width direction end portions of the upper end portion of the radiator support 20. Furthermore, a front fender apron 26 and a suspension tower 28 bridge the right and left apron upper members 22 and the right and left front side members 18, and front wheel wells 32 that house front wheels 30 are formed between the right and left apron upper members 22 and the right and left front side members 18.

Front pillar lower portions (lower portions) 34A that configure the lower portions of right and left front pillars 34 are disposed on the vehicle rear side of the right and left front wheel wells 32. The rear end portions of the right and left apron upper members 22 are joined to the upper end portions of the right and left front pillar lower portions 34A. Moreover, front pillar upper portions (upper portions) 34B that configure the upper portions of the right and left front pillars 34 extend obliquely upward in the vehicle rear direction from the upper end portions of the right and left front pillar lower portions 34A. Non-illustrated roof side rails extend in the vehicle rear direction from the upper end portions of the front pillar upper portions 34B, and rockers 36 extend in the vehicle rear direction from the lower end portions of the front pillar lower portions 34A.

The front pillars 34 and the rockers 36 are members having closed cross sections that form the skeleton of the vehicle body and, together with the non-illustrated roof side rails and center pillars (B pillars), form door openings 38 for occupants to enter and exit the vehicle. The door openings 38 are formed in the side portions of the cabin 16 and are configured to be opened and closed by non-illustrated side doors. It will be noted that the front end portions of the side doors are rotatably coupled to the front pillars 34 via pairs of upper and lower door hinges 40 (only shown in FIG. 4, FIG. 8, and FIG. 9), so that the side doors open and close the door openings 38 by rotating.

As shown in FIG. 1 to FIG. 3 and FIG. 5, each rocker 36 is equipped with a rocker outer reinforcement 42 that serves as a rocker reinforcement. The rocker outer reinforcement 42 is formed in a long shape whose lengthwise direction coincides with the lengthwise direction of the rocker 36 (the vehicle front and rear direction), and the rocker outer reinforcement 42 has a cross-sectionally hat shape that opens inward in the vehicle width direction as seen from the vehicle front and rear direction.

Figure 3:
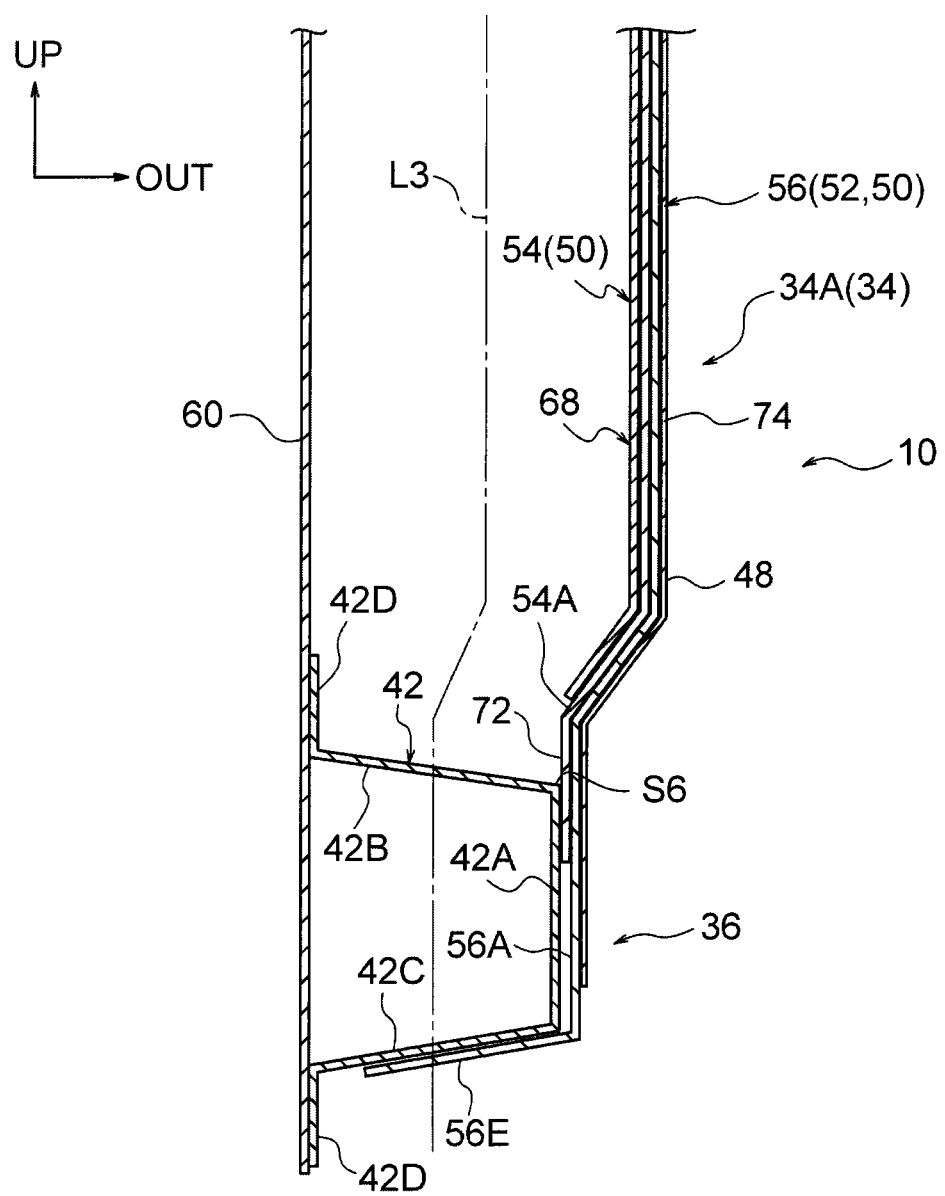
FIG. 3 is an enlarged cross-sectional view showing an enlargement of a cross section cut along line F3-F3 of FIG. 2.

As shown in FIG. 3, the rocker outer reinforcement 42 is configured to have a side wall portion 42A, an upper wall portion 42B and lower wall portion 42C that extend inward in the vehicle width direction from the vehicle upper and lower ends of the side wall portion 42A, and flanges 42D that stick out from the vehicle width direction inside ends of the upper wall portion 42B and the lower wall portion 42C. An inner panel 60 disposed on the vehicle width direction inside of the rocker outer reinforcement 42 is joined by a technique such as spot welding, for example, to the flanges 42D.

Furthermore, a side outer panel 48 (only shown in FIG. 3 and FIG. 4) that forms the external design surface of the vehicle is disposed on the vehicle width direction outside of the rocker outer reinforcement 42. The rocker outer reinforcement 42 is formed by a high-strength sheet metal material whose sheet thickness is thicker than that of the side outer panel 48 and the inner panel 60, and the rocker outer reinforcement 42 reinforces the rocker 36.

As shown in FIG. 1 to FIG. 5, the front pillar 34 is equipped with a pillar reinforcement 50. The pillar reinforcement 50 is configured by a pillar outer reinforcement 52 and a hinge reinforcement 54.

The pillar outer reinforcement 52 is configured by an outer reinforcement lower portion 56, which reinforces the front pillar lower portion 34A, and an outer reinforcement upper portion 58, which reinforces the front pillar upper portion 34B. The lower end portion of the outer reinforcement upper portion 58 is laid on top of, in the vehicle width direction, and joined to the upper end portion of the outer reinforcement lower portion 56, and the rear end portion of the apron upper member 22 is laid on top of, in the vehicle width direction, and joined to the upper end portion of the outer reinforcement lower portion 56.

Figure 4:
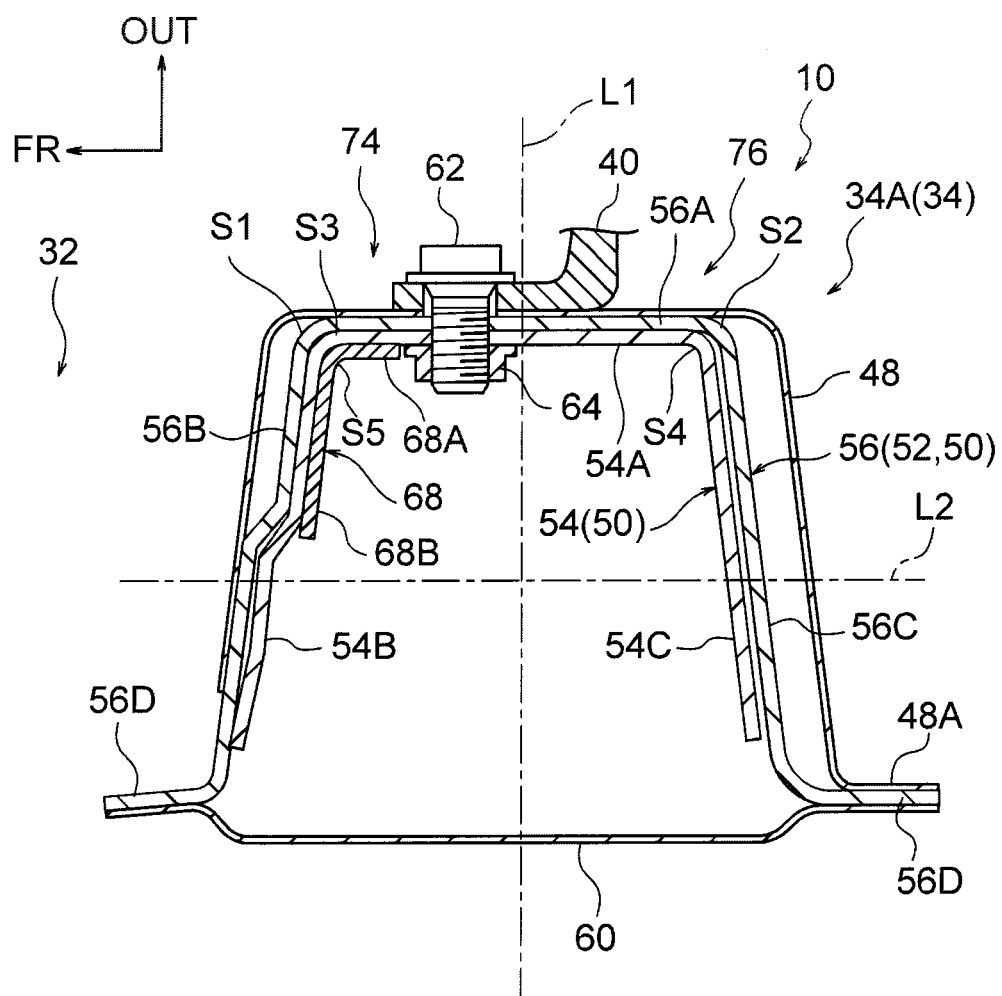
FIG. 4 is an enlarged cross-sectional view showing an enlargement of a cross section cut along line F4-F4 of FIG. 2.

The outer reinforcement lower portion 56 is formed in a long shape whose lengthwise direction coincides with the lengthwise direction of the front pillar lower portion 34A (the vehicle up and down direction), and the outer reinforcement lower portion 56 has a cross-sectionally hat shape that opens inward in the vehicle width direction as seen from the vehicle up and down direction. As shown in FIG. 4, the outer reinforcement lower portion 56 is configured to have a side wall portion 56A, a front wall portion 56B and a rear wall portion 56C that extend inward in the vehicle width direction from the vehicle front and rear ends of the side wall portion 56A, and flanges 56D that stick out from the vehicle width direction inside ends of the front wall portion 56B and the rear wall portion 56C. Ridgelines S1 and S2 that extend in the vehicle up and down direction are formed in the outer reinforcement lower portion 56 between the front wall portion 56B and the side wall portion 56A and between the side wall portion 56A and the rear wall portion 56C.

As shown in FIG. 4, the inner panel 60 disposed on the vehicle width direction inside of the outer reinforcement lower portion 56 is joined by a technique such as spot welding, for example, to the front and rear flanges 56D. Furthermore, the side outer panel 48 is disposed on the vehicle width direction outside of the outer reinforcement lower portion 56, and a flange 48A disposed on the rear end portion of the side outer panel 48 is joined by a technique such as spot welding, for example, to the flange 56D on the rear side. The outer reinforcement lower portion 56 is formed by a high-strength sheet metal material whose sheet thickness is thicker than that of the side outer panel 48 and the inner panel 60, and the outer reinforcement lower portion 56 reinforces the front pillar lower portion 34A.

It will be noted that, in the present embodiment, the portion of the front pillar 34 on the vehicle front side of the front and rear direction center (see long dashed short dashed line L1 in FIG. 4) of the closed cross section of the front pillar 34 will be called a "front portion" of the front pillar 34, and the portion of the front pillar 34 on the vehicle rear side of the front and rear direction center of the closed cross section of the front pillar 34 will be called a "rear portion" of the front pillar 34. Furthermore, long dashed short dashed line L3 in FIG. 3 and long dashed short dashed line L2 in FIG. 4 indicate the vehicle width direction center of the closed cross section of the front pillar 34.

Figure 2:
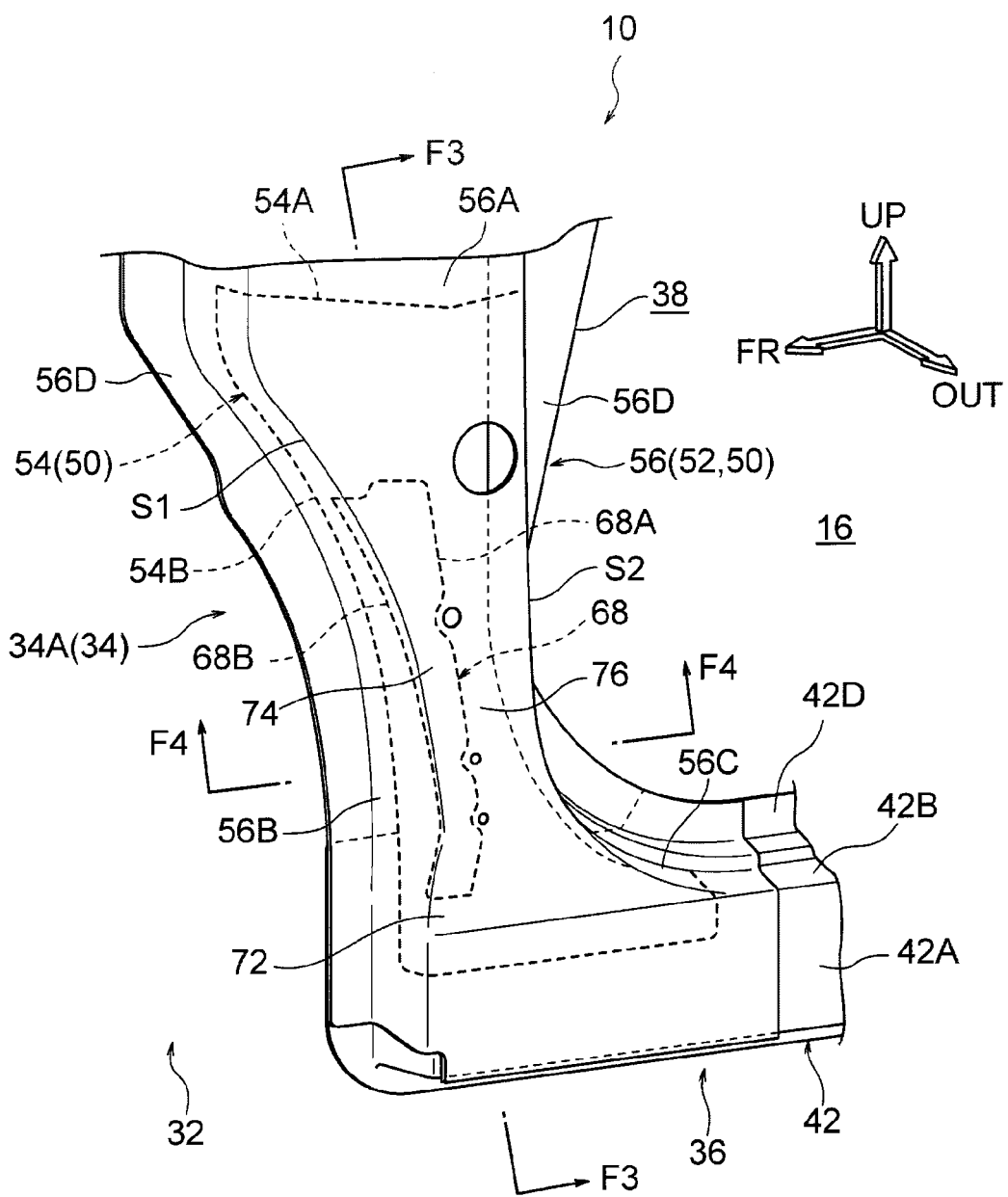
FIG. 2 is a perspective view showing the configuration of the environs of a front pillar lower portion of the same automobile.

As shown in FIG. 2, the front wall portion 56B of the outer reinforcement lower portion 56 extends further downward than the upper wall portion 42B of the rocker outer reinforcement 42, and the rocker outer reinforcement 42 is covered from the vehicle front side by the front wall portion 56B. Furthermore, as shown in FIG. 3, the lower end portion of the side wall portion 56A of the outer reinforcement lower portion 56 is laid on top of the vehicle width direction outside surface of the front end portion of the side wall portion 42A of the rocker outer reinforcement 42 and is joined to the side wall portion 42A by a technique such as spot welding, for example.

Moreover, a lower wall portion 56E extends inward in the vehicle width direction from the lower end of the side wall portion 56A of the outer reinforcement lower portion 56. The lower wall portion 56E is laid on top of the lower surface of the lower wall portion 42C of the rocker outer reinforcement 42 and is joined to the lower wall portion 42C by a technique such as spot welding, for example. The hinge reinforcement 54 is disposed on the inside of the outer reinforcement lower portion 56.

The hinge reinforcement 54 is formed in a long shape whose lengthwise direction coincides with the lengthwise direction of the front pillar lower portion 34A (the vehicle up and down direction), and the hinge reinforcement 54 has a cross-sectionally substantially U-shape that opens inward in the vehicle width direction as seen from the vehicle up and down direction. The hinge reinforcement 54 is disposed on the vehicle rear side of the front wheel well 32 and on the lower portion side in the front pillar lower portion 34A. The hinge reinforcement 54 has a side wall portion 54A, which is fastened and fixed to the side wall portion 56A of the outer reinforcement lower portion 56 together with the door hinge 40 on the lower side, and a front wall portion 54B and a rear wall portion 54C, which extend inward in the vehicle width direction from the vehicle front and rear ends of the side wall portion 54A.

It will be noted that the members to which reference signs 62 and 64 are assigned in FIG. 4 are a bolt and a nut for fastening the door hinge 40. The hinge reinforcement 54 is formed by a high-strength sheet metal material having the same sheet thickness as the outer reinforcement lower portion 56, and the hinge reinforcement 54 reinforces the front pillar lower portion 34A together with the outer reinforcement lower portion 56.

The front wall portion 54B and the rear wall portion 54C are joined by a technique such as spot welding, for example, to the front wall portion 56B and the rear wall portion 56C of the outer reinforcement lower portion 56. Furthermore, the lower end portion of the side wall portion 54A of the hinge reinforcement 54 is interposed between the side wall portion 42A of the rocker outer reinforcement 42 and the side wall portion 56A of the outer reinforcement lower portion 56 and is joined to the side wall portion 42A and the side wall portion 56A by a technique such as spot welding, for example.

Ridgelines S3 and S4 that extend in the vehicle up and down direction are formed in the hinge reinforcement 54 between the front wall portion 54B and the side wall portion 54A and between the side wall portion 54A and the rear wall portion 54C. The ridgelines S3 and S4 oppose the ridgelines S1 and S2, respectively, of the outer reinforcement lower portion 56. A reinforcing patch 68 that serves as a reinforcing member is disposed on the inside of the hinge reinforcement 54, that is, in the front pillar lower portion 34A.

The reinforcing patch 68 is, for example, formed in a long shape by a high-strength sheet metal material having the same sheet thickness as the outer reinforcement lower portion 56 and the hinge reinforcement 54. The reinforcing patch 68 is positioned on the vehicle rear side of the front wheel well 32 in a posture in which its lengthwise direction lies along the lengthwise direction of the front pillar lower portion 34A (the vehicle up and down direction). The dimensions of the reinforcing patch 68 in the vehicle front and rear direction and the vehicle width direction are set sufficiently shorter than those of the front pillar lower portion 34A, and the reinforcing patch 68 is disposed near the vehicle front side and near the vehicle width direction outside in the front pillar lower portion 34A.

The reinforcing patch 68 extends in the vehicle up and down direction along the ridgelines S1 and S3 on the front side of the pillar reinforcement 50 and opposes the ridgelines S1 and S3 from the vehicle width direction inside. The reinforcing patch 68 is integrally equipped with a side wall portion 68A, which is laid on top of the vehicle width direction inside surface of the side wall portion 54A of the hinge reinforcement 54, and a front wall portion 68B, which extends inward in the vehicle width direction from the front end of the side wall portion 68A, so that the reinforcing patch 68 has a substantially L-shape as seen from the vehicle up and down direction.

As shown in FIG. 1 and FIG. 2, the side wall portion 68A is formed in such a way that its dimension in the vehicle front and rear direction becomes larger heading in the vehicle up direction, and the side wall portion 68A is joined to the side wall portion 54A by a technique such as spot welding, for example, at plural places lined up in the vehicle up and down direction. Likewise, the front wall portion 68B is joined to the front wall portion 54B by a technique such as spot welding, for example, at plural places lined up in the vehicle up and down direction. A ridgeline S5 that extends in the vehicle up and down direction is formed between the front wall portion 68B and the side wall portion 68A. The ridgeline S5 opposes the ridgeline S3 on the front side of the hinge reinforcement 54.

As shown in FIG. 3, the lower end portion of the reinforcing patch 68 is not joined to the rocker outer reinforcement 42 but is disposed slightly away from, on the vehicle upper side of, the upper wall portion 42B of the rocker outer reinforcement 42. Furthermore, as shown in FIG. 1, the upper end portion of the reinforcing patch 68 opposes (here, opposes while being in contact with or being in proximity to), from the vehicle rear side, the rear end portion of the apron upper member 22, and the lower end portion of the rear end portion of the apron upper member 22 and the upper end portion of the reinforcing patch 68 overlap one another in the vehicle up and down direction. It will be noted that reference sign L in FIG. 1 denotes the amount of overlap, in the vehicle up and down direction, between the apron upper member 22 and the reinforcing patch 68.

The reinforcing patch 68 is disposed only on the front portion side and the vehicle width direction outside in the front pillar lower portion 34A, and a reinforcing member like the reinforcing patch 68 is not disposed on the rear portion side and the vehicle width direction inside in the front pillar lower portion 34A. Because the reinforcing patch 68 is disposed, the front portion side of the front pillar lower portion 34A is more rigid than the rear portion side of the front pillar lower portion 34A.

That is to say, in the present embodiment, because only the environs of the ridgelines S1 and S3 on the front side of the pillar reinforcement 50 are partially reinforced by the reinforcing patch 68, the difference in rigidity described above is set in the front pillar lower portion 34A. In other words, a reinforced portion (strong portion) 74 reinforced by the reinforcing patch 68 is set on the front portion side of the front pillar lower portion 34A, and a non-reinforced portion (weak portion) 76 not reinforced by a reinforcing member like the reinforcing patch 68 is set on the rear portion side of the front pillar lower portion 34A. Furthermore, in the present embodiment, because the lower end portion of the reinforcing patch 68 is not joined to the rocker outer reinforcement 42, in the lower end portion of the pillar reinforcement 50 a non-reinforced portion (weak portion) 72 is set between the lower end of the reinforcing patch 68 and the rocker outer reinforcement 42.

(Action and Effects)

Next, the action and effects of the present embodiment will be described. It will be noted that the "frontal crash" mentioned below includes a full overlap crash, an offset crash, a small overlap crash, and an oblique crash.

In the vehicle front portion structure 10 having the configuration described above, the reinforcing patch 68 formed long in the vehicle up and down direction is disposed in the front pillar lower portion 34A. The reinforcing patch 68 is disposed near the vehicle front side in the front pillar lower portion 34A and reinforces the front portion side of the front pillar lower portion 34A. For this reason, when the load of a frontal crash has been input to the front pillar lower portion 34A, the rear portion side (the non-reinforced portion 76) of the front pillar lower portion 34A not reinforced by the reinforcing patch 68 becomes deformed, and thus the crash energy can be absorbed.

Moreover, the reinforcing patch 68 is not joined to the rocker outer reinforcement 42, so the crash load concentrates in the non-reinforced portion 72 of the front pillar lower portion 34A between the reinforcing patch 68 and the rocker outer reinforcement 42. Because of this, the front pillar lower portion 34A becomes deformed originating (deformation starting height) at the non-reinforced portion 72, and thus a bending moment can be kept from occurring in the rocker outer reinforcement 42. This contributes to preventing bending of the rocker 36. Thus, for the reasons stated above, according to the present invention, the present invention contributes to controlling deformation of the cabin 16.

The above effects will be described in detail using a comparative example 80 shown in FIG. 6 and FIG. 7. It will be noted that, in FIG. 6 and FIG. 7, the same reference signs are assigned to configurations that are the same as those in the present embodiment.

Figure 6:
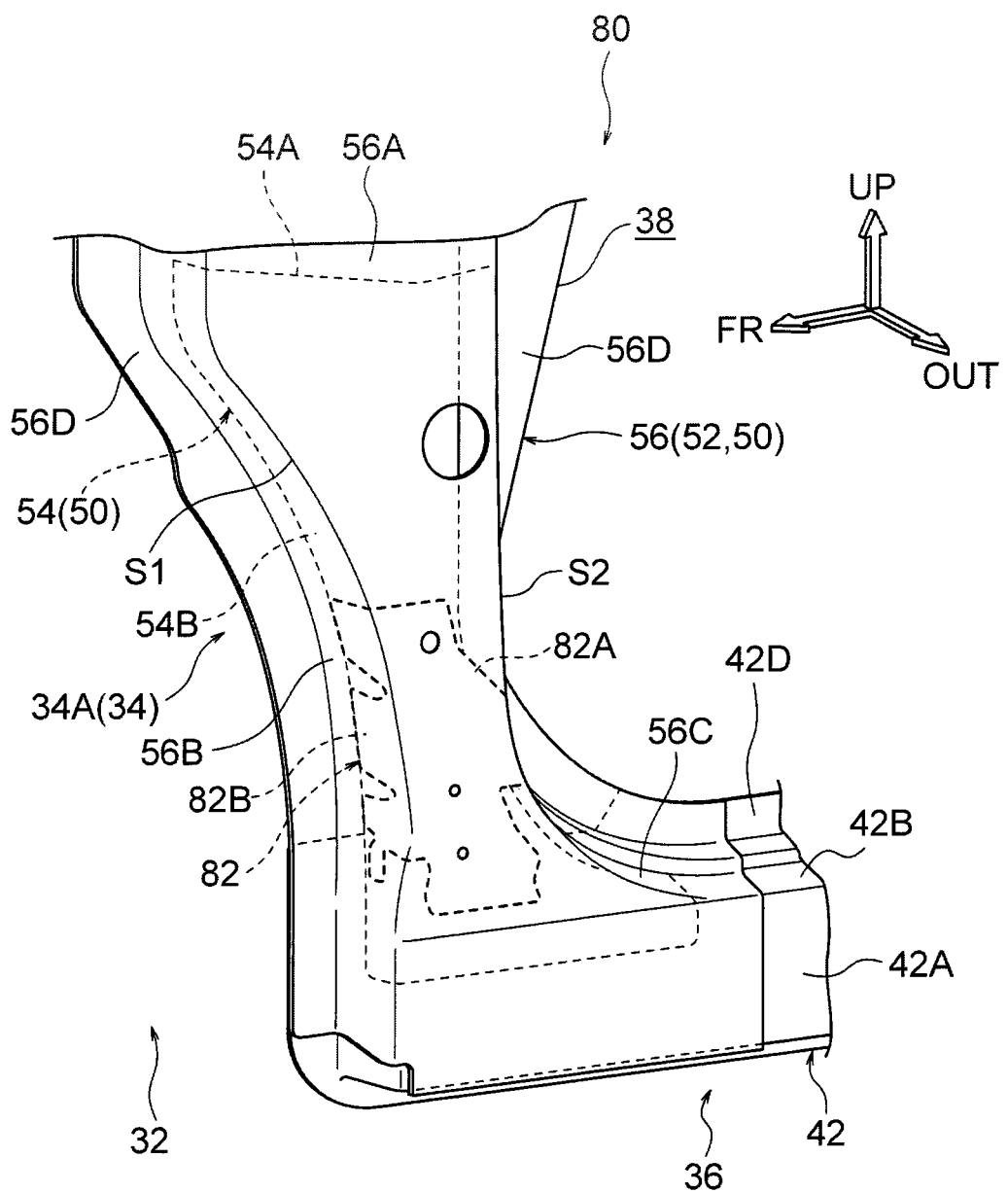
FIG. 6 is a perspective view showing the configuration of the environs of a front pillar lower portion of an automobile pertaining to a comparative example.

In the comparative example 80 shown in FIG. 6, a bulkhead 82 is disposed instead of the reinforcing patch 68 pertaining to the present embodiment on the inside of the hinge reinforcement 54. The bulkhead 82 is formed by the same sheet metal material as the reinforcing patch 68 but has a cross-sectionally substantially U-shape that opens inward in the vehicle width direction as seen from the vehicle up and down direction. The bulkhead 82 is equipped with a side wall portion 82A that is joined to the vehicle width direction inside surface of the side wall portion 54A of the hinge reinforcement 54, a front wall portion 82B that is joined to the rear surface of the front wall portion 54B, and a non-illustrated rear wall that is joined to the front surface of the rear wall portion 54C, and the bulkhead 82 mates with the inside of the front pillar lower portion 34A.

Figure 7:
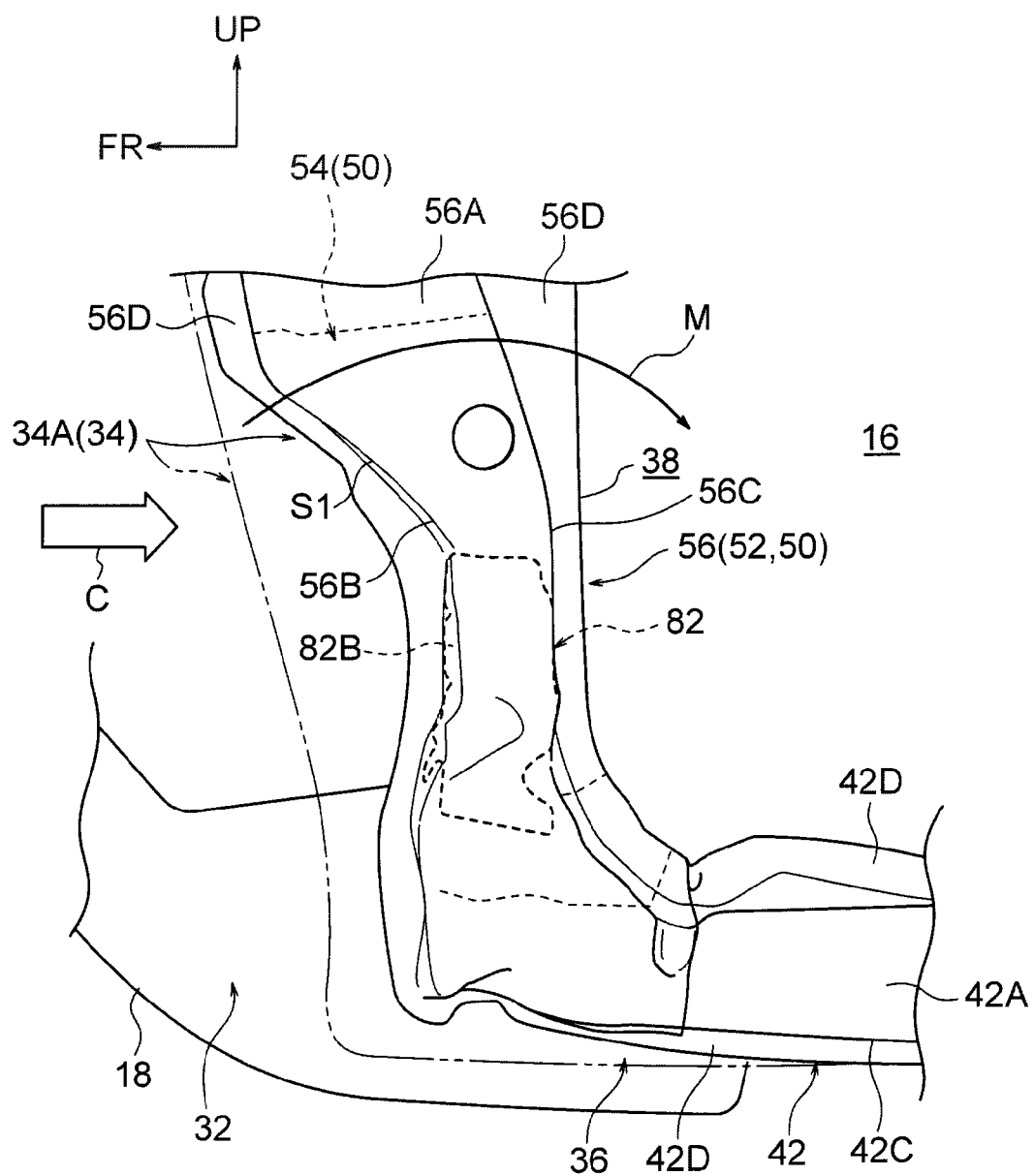
FIG. 7 is a side view showing a state in which the environs of the same front pillar lower portion have become deformed by a frontal crash.
Figure 8:
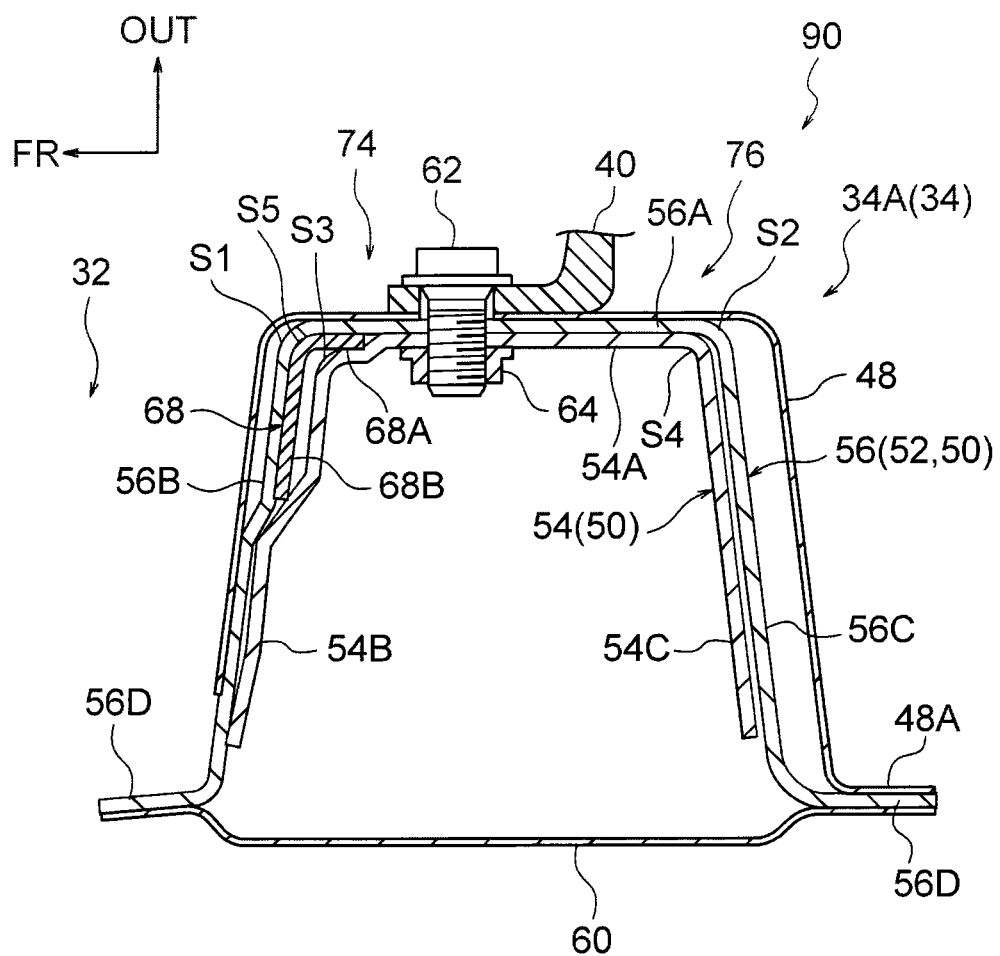
FIG. 8 is a cross-sectional view corresponding to FIG. 4 showing a first example modification of the vehicle front portion structure pertaining to the embodiment of the present invention.
Figure 9:
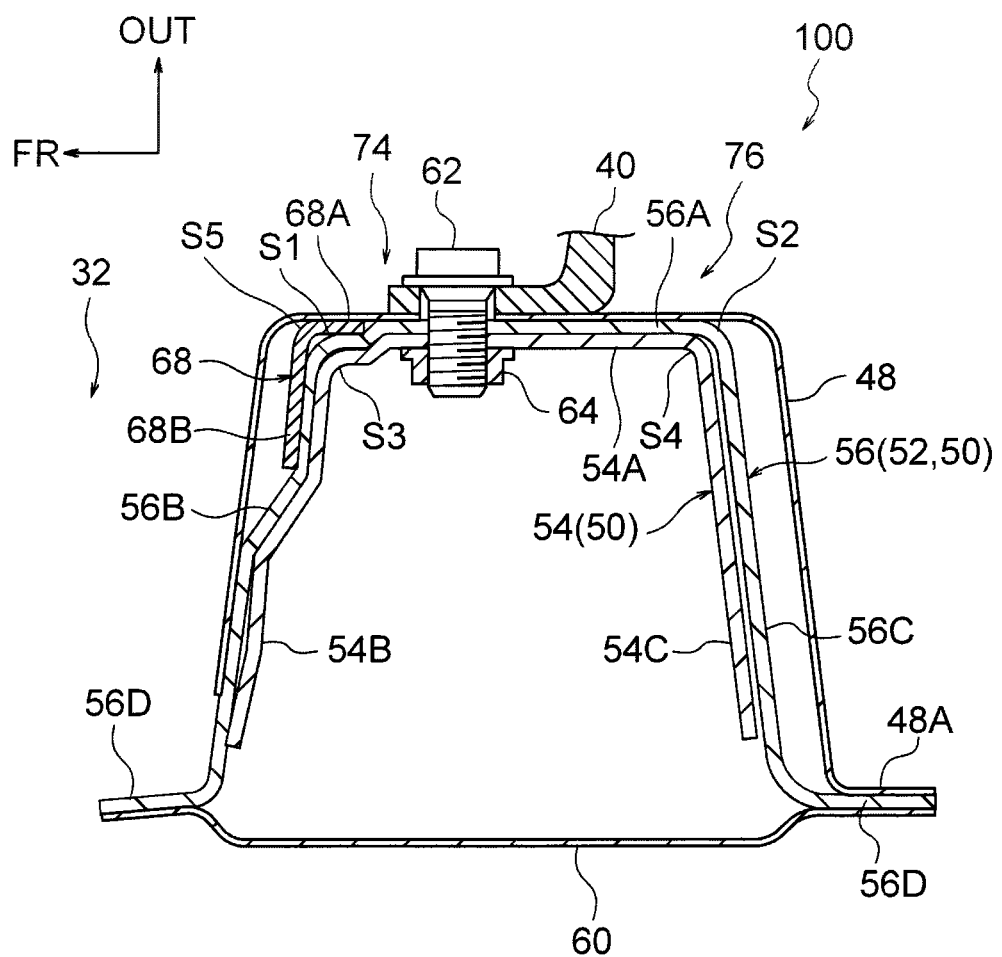
FIG. 9 is a cross-sectional view corresponding to FIG. 4 showing a second example modification of the vehicle front portion structure pertaining to the embodiment of the present invention.

In the comparative example 80, as shown in FIG. 7, when the load of a frontal crash has been input to the front pillar lower portion 34A, the outer reinforcement lower portion 56 becomes locally deformed in the vicinity of the upper end of the bulkhead 82. Owing to this, the front pillar lower portion 34A becomes bent as seen in a side view, and a moment M that tries to collapse the front pillar lower portion 34A in the vehicle rear direction occurs. As a result, the rocker outer reinforcement 42 becomes bent in the vicinity of the rear end of the lower end portion of the outer reinforcement lower portion 56, and the deformation of the vehicle body at the door opening 38 increases. Furthermore, the ridgeline (see ridgeline S6 in FIG. 3) of the rocker outer reinforcement 42 that extends in the vehicle front and rear direction becomes bent, and thus the yield strength of the rocker outer reinforcement 42 with respect to the load from the vehicle front side drops and the amount of axial compression deformation of the rocker outer reinforcement 42 increases. Thus, for the reasons stated above, in the comparative example 80 the amount of deformation of the cabin 16 ends up increasing. That is to say, in the comparative example 80 the same problem as in the side portion vehicle body structure for a vehicle described in the Related Art section occurs.

Figure 5:
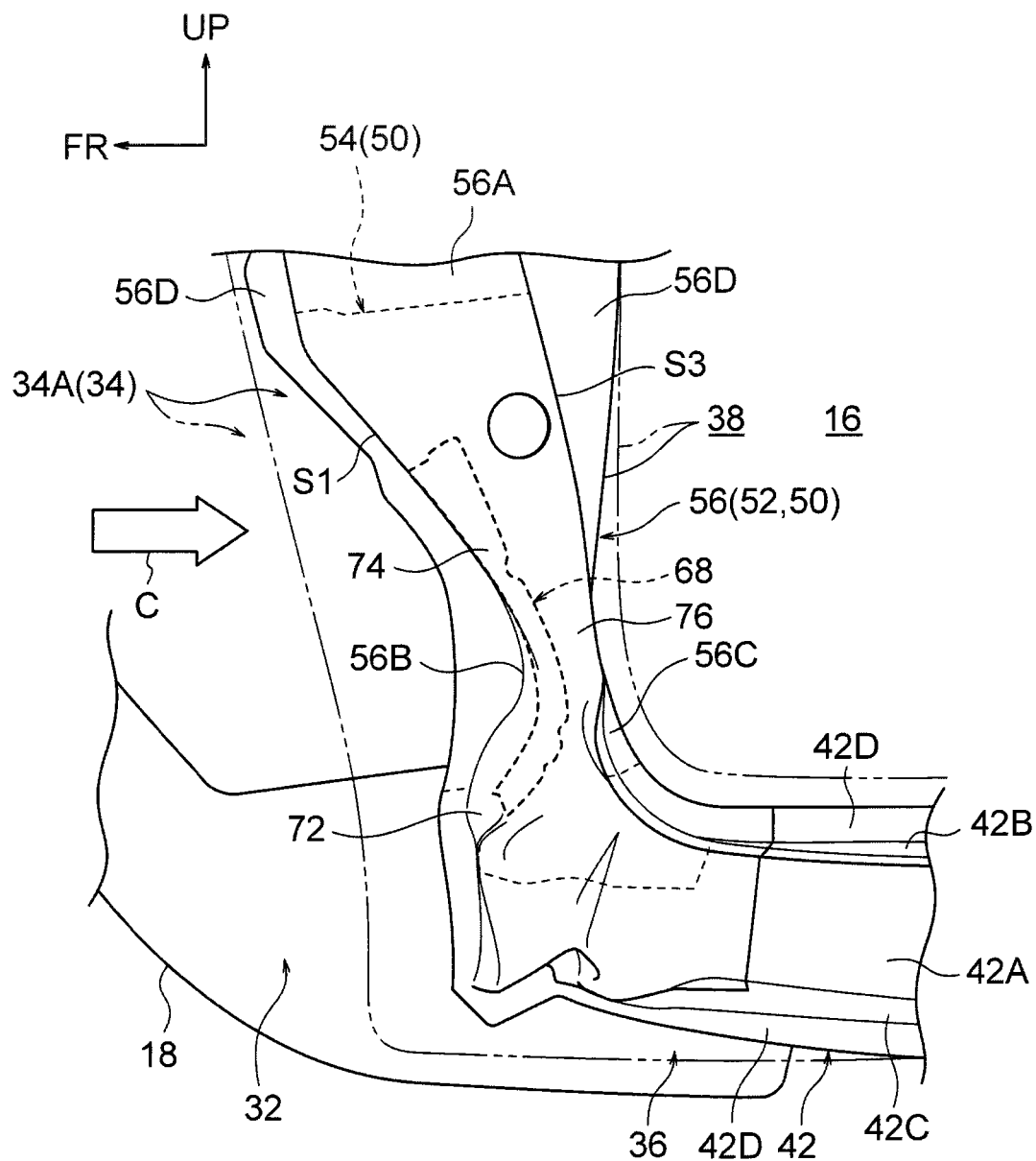
FIG. 5 is a side view showing a state in which the environs of the same front pillar lower portion have become deformed by a frontal crash.

In contrast, in the present embodiment, when the load of a frontal crash has been input to the front pillar lower portion 34A, as shown in FIG. 5, the front pillar lower portion 34A becomes deformed originating at the non-reinforced portion 72, and the cross section of the front pillar lower portion 34A is crushed. Because of this, the crash load is absorbed, bending of the outer reinforcement lower portion 56 is prevented, and the moment that tries to collapse the front pillar lower portion 34A in the vehicle rear direction decreases. As a result, the bending moment that occurs in the rocker outer reinforcement 42 also decreases, and bending of the rocker outer reinforcement 42 is prevented. Owing to this, the yield strength of the ridgeline S6 of the rocker outer reinforcement 42 can be effectively utilized to control deformation of the cabin 16, and deformation of the cabin 16 can be kept to a minimum. It will be noted that, in FIG. 5 and FIG. 7, arrow C indicates the crash direction.

Moreover, in the present embodiment, the upper end portion of the reinforcing patch 68 opposes, from the vehicle rear side, the rear end portion of the apron upper member 22. For this reason, the load from the apron upper member 22 moving backward in the vehicle rear direction because of the frontal crash can be transmitted via the reinforcing patch 68 to the lower end portion side of the pillar reinforcement 50. Additionally, the transmitted load can be concentrated in the non-reinforced portion 72 of the pillar reinforcement 50. This can promote deformation of the front pillar 34 originating at the non-reinforced portion 72.

Moreover, in the present embodiment, the front pillar lower portion 34A is reinforced by the reinforcing patch 68 disposed near the vehicle front side and near the vehicle width direction outside in the front pillar lower portion 34A. Because the reinforcing patch 68 is locally disposed in the front pillar lower portion 34A in this way, the amount of energy absorbed by the deformation of the front pillar lower portion 34A can be effectively ensured, and, at the same time, mass and cost can be kept from increasing.

Furthermore, in the present embodiment, the ridgelines S1 and S3 on the front side of the vehicle width direction outside end portion of the front pillar lower portion 34A are reinforced by the reinforcing patch 68. Because of this, the front portion side of the front pillar lower portion 34A can be effectively reinforced by the compact reinforcing patch 68.

In this way, in the present embodiment, by intentionally reinforcing the ridgelines S1 and S3 on the front side of the front pillar lower portion 34A and not reinforcing the ridgelines S2 and S4 on the rear side, the mode of deformation of the front pillar lower portion 34A at the time of a frontal crash is controlled and the crash load is absorbed by the deformation of the front pillar lower portion 34A. Furthermore, by setting, in the vicinity of the upper wall portion 42B of the rocker outer reinforcement 42, the height of the non-reinforced portion 72 that becomes the origin of deformation of the front pillar lower portion 34A, the bending moment that occurs in the rocker outer reinforcement 42 is effectively controlled, and bending of the rocker 36 is prevented.

Moreover, because just the environs of the ridgelines S1 and S3 on the front side of the front pillar lower portion 34A are reinforced by the compact reinforcing patch 68, manufacturing constraints can be reduced. That is to say, in a case where, like in the comparative example 80, the cross-sectionally substantially U-shaped large bulkhead 82 is set on the inside of the hinge reinforcement 54, there are cases where welding becomes difficult as a result of exceeding the limit on the number (sheet thickness) of weldable sheets or insufficient welding pressure at the time of welding, but in the present embodiment this can be avoided. Additionally, an increase in cost and mass can be kept to a minimum, and, at the same time, the front pillar lower portion 34A can be efficiently reinforced.

Supplementary Description of the Embodiment

In the above embodiment, the present invention is given a configuration where the reinforcing patch 68 is disposed on the inside of the hinge reinforcement 54, but the present invention is not limited to this. That is to say, the present invention may also be given a configuration where, like in a first example modification 90 shown in FIG. 8, the reinforcing patch 68 is disposed between the hinge reinforcement 54 and the outer reinforcement lower portion 56. Furthermore, the present invention may also be given a configuration where, like in a second example modification 100 shown in FIG. 9, the reinforcing patch 68 is disposed between the outer reinforcement lower portion 56 and the side outer panel 48.

Furthermore, in the above embodiment, the present invention is given a configuration where the upper end portion of the reinforcing patch 68 overlaps, in the vehicle up and down direction, the lower end portion of the rear end portion of the apron upper member 22, but the present invention may also be given a configuration where the upper end portion of the reinforcing patch 68 is disposed on the lower side of the lower end portion of the rear end portion of the apron upper member 22.

Figure 10:
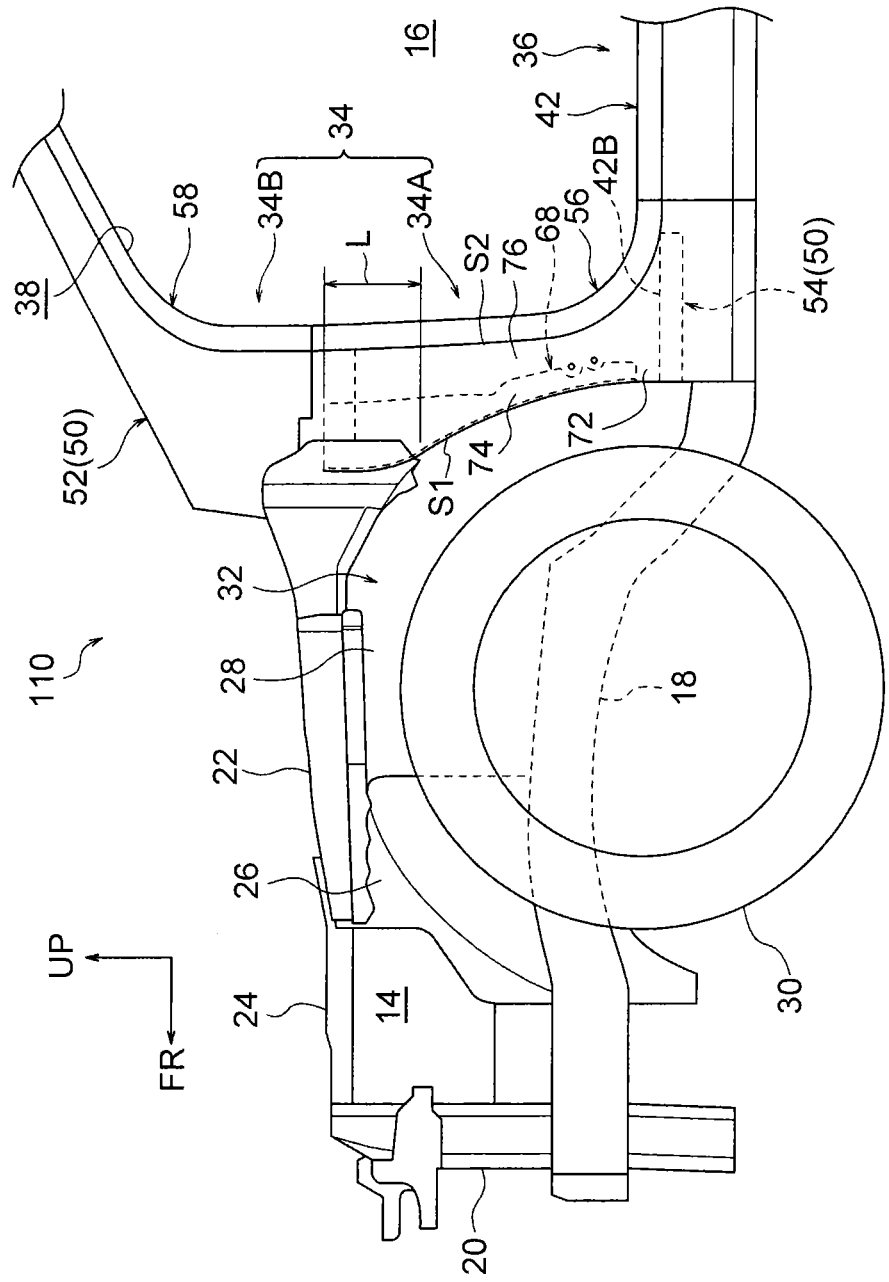
FIG. 10 is a side view corresponding to FIG. 1 showing a third example modification of the vehicle front portion structure pertaining to the embodiment of the present invention.

Furthermore, the amount of overlap L, in the vehicle up and down direction, between the reinforcing patch 68 and the apron upper member 22 may also be increased like in a third example modification 110 shown in FIG. 10. In the third example modification, the upper end portion of the reinforcing patch 68 is laid on top of and joined to the joined portion between the outer reinforcement lower portion 56 and the outer reinforcement upper portion 58. In the third example modification 110, because the amount of overlap is increased as described above, transmission efficiency when transmitting the load of a frontal crash from the apron upper member 22 via the reinforcing patch 68 to the lower end portion side of the pillar reinforcement 50 can be improved.

Figure 11:
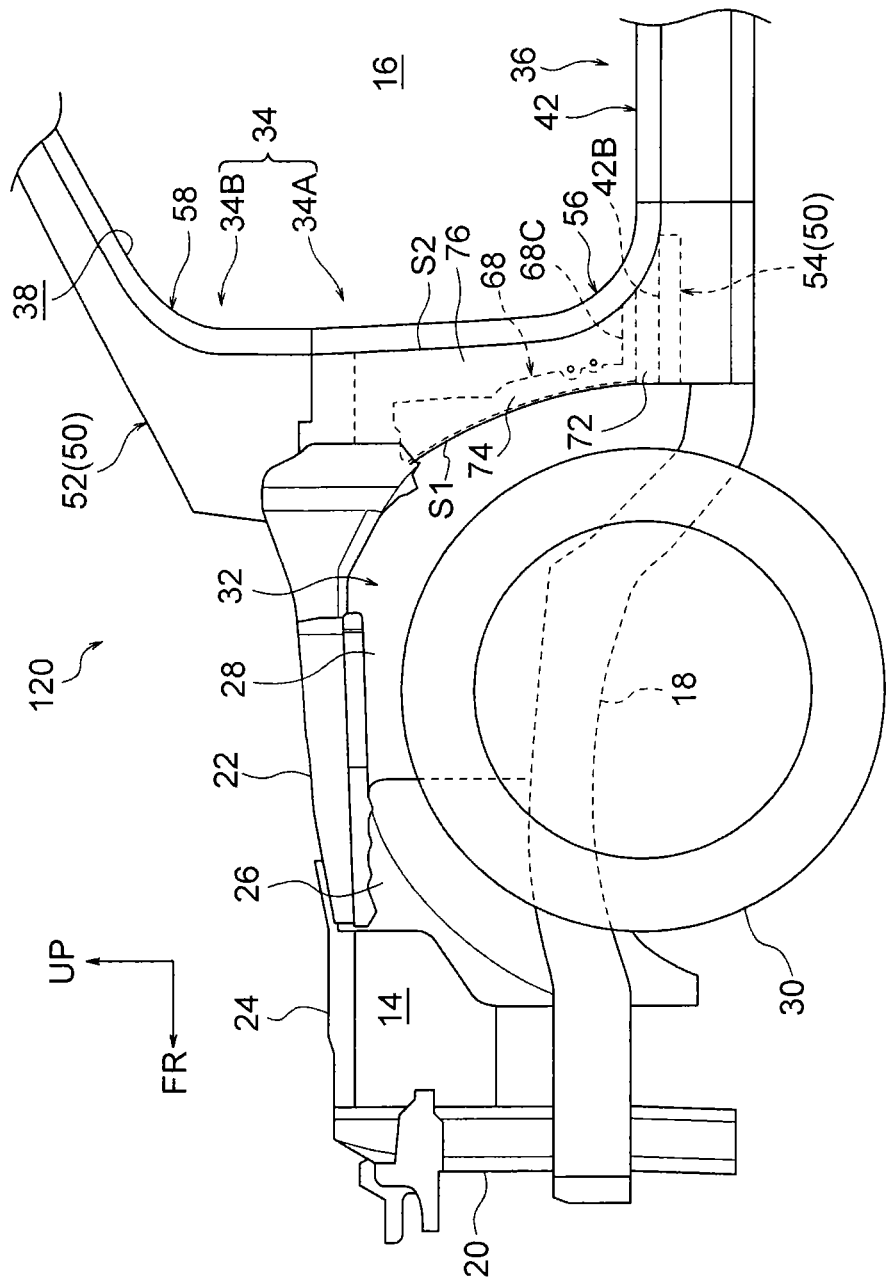
FIG. 11 is a side view corresponding to FIG. 1 showing a fourth example modification of the vehicle front portion structure pertaining to the embodiment of the present invention.

Furthermore, in the above embodiment, the present invention is given a configuration where the reinforcing patch 68 is disposed only on the front portion side of the front pillar lower portion 34A, but the present invention is not limited to this and may also be given a configuration where a part of the reinforcing patch 68 is disposed on the rear portion side of the front pillar lower portion 34A. For example, the present invention may also be given a configuration where, like in a fourth example modification 120 shown in FIG. 11, a part 68C of the reinforcing patch 68 extends in the vehicle rear direction and is disposed on the rear portion side of the front pillar lower portion 34A. In the fourth example modification also, basically the same action and effects as those of the above embodiment can be obtained provided that the part 68C is weak enough not to obstruct the deformation of the non-reinforced portion 76.

Figure 12:
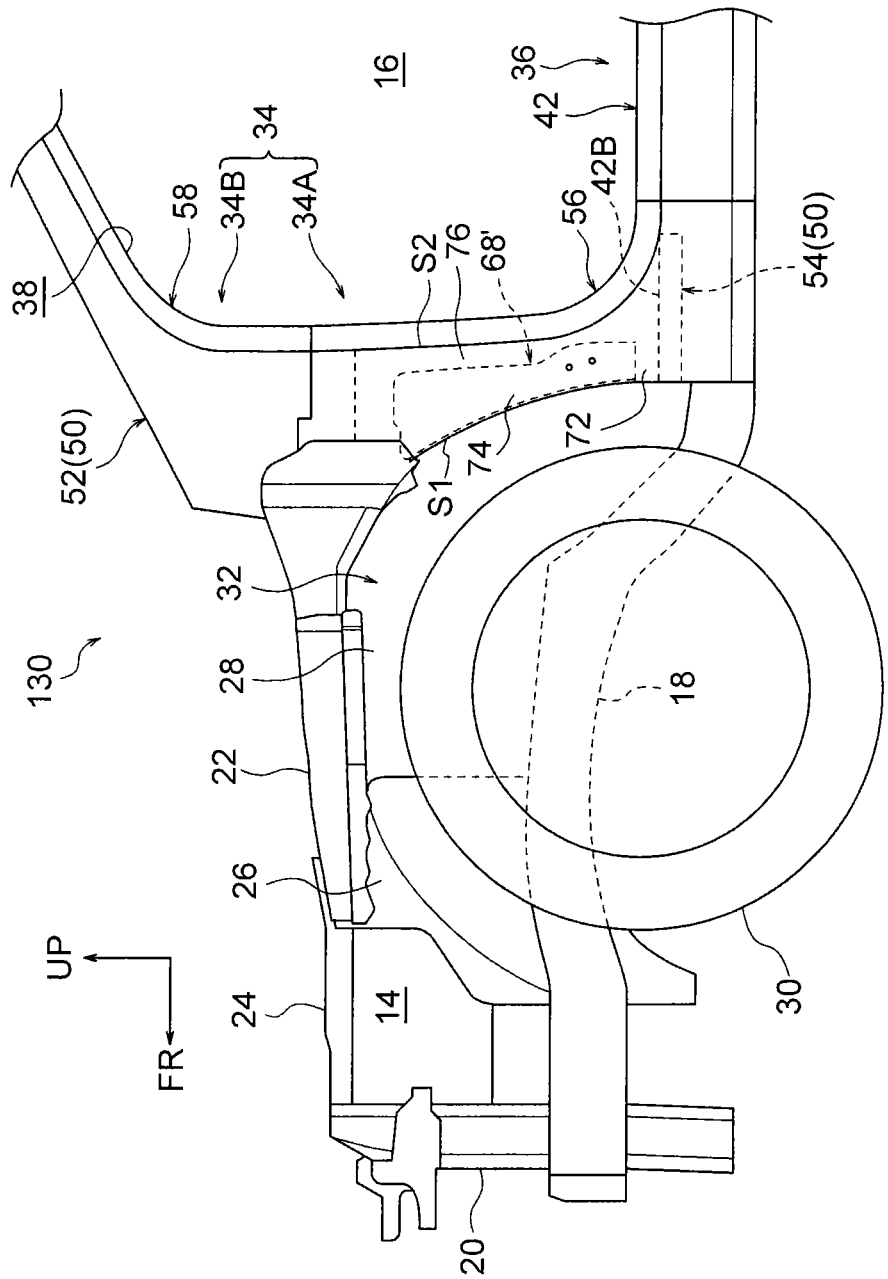
FIG. 12 is a side view corresponding to FIG. 1 showing a fifth example modification of the vehicle front portion structure pertaining to the embodiment of the present invention.

Furthermore, for example, the present invention may also be given a configuration where, like in a fifth example modification 130 shown in FIG. 12, the rear end portion of the reinforcing patch 68 sticks out toward the rear portion side in the front pillar lower portion 34A. In the fifth example modification 130 also, the reinforcing patch 68 is disposed near the vehicle front side in the front pillar lower portion 34A, and the non-reinforced portion 76 is set in the rear portion of the front pillar lower portion 34A, so basically the same action and effects as those of the above embodiment can be obtained.

Moreover, in the above embodiment, the present invention is given a configuration where the reinforcing patch 68 that serves as the reinforcing member is disposed near the vehicle width direction outside in the front pillar lower portion 34A that is the lower portion of the front pillar 34, but the present invention is not limited to this and may also be given a configuration where the reinforcing member is disposed near the vehicle width direction inside in the lower portion of the front pillar.

In addition, the present invention can be changed and implemented in a variety of ways without departing from the spirit thereof. Furthermore, the scope of the rights of the present invention is, of course, not limited to the above embodiment.

What is claimed is:

1. A vehicle front portion structure comprising:
 a front pillar having a lower portion disposed on a vehicle rear side of a front wheel well;
 a rocker having a front end portion joined to a lower end portion of the lower portion of the front pillar; and
 a reinforcing member that is formed with a length in a vehicle up and down direction, is disposed near a vehicle front side in the lower portion of the front pillar, reinforces a front portion side of the lower portion, and is not joined directly to the rocker, wherein
 a rear end portion of an upper member is joined to an upper end portion of the lower portion of the front pillar, and
 an upper end portion of the reinforcing member opposes, from the vehicle rear side, the rear end portion of the upper member.

2. The vehicle front portion structure of claim 1, wherein the reinforcing member is disposed near a vehicle width direction outer side, in the lower portion of the front pillar.

3. The vehicle front portion structure of claim 2, wherein:
 ridgelines that extend in the vehicle up and down direction are formed on both front and rear sides of a vehicle width direction outer side end portion of the lower portion of the front pillar, and
 the reinforcing member opposes the ridgelines on the front side.

* * * * *